United States Patent
Fujishiro et al.

(10) Patent No.: US 10,368,279 B2
(45) Date of Patent: Jul. 30, 2019

(54) COMMUNICATION METHOD, RADIO TERMINAL, AND BASE STATION

(71) Applicant: KYOCERA CORPORATION, Kyoto (JP)

(72) Inventors: Masato Fujishiro, Yokohama (JP); Chiharu Yamazaki, Tokyo (JP); Susumu Kashiwase, Machida (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/044,395

(22) Filed: Jul. 24, 2018

(65) Prior Publication Data

US 2018/0359669 A1 Dec. 13, 2018

Related U.S. Application Data

(63) Continuation of application No. PCT/JP2017/002587, filed on Jan. 25, 2017.

(30) Foreign Application Priority Data

Jan. 25, 2016 (JP) .................................. 2016-011916

(51) Int. Cl.
*H04W 36/04* (2009.01)
*H04W 76/10* (2018.01)
(Continued)

(52) U.S. Cl.
CPC ....... *H04W 36/04* (2013.01); *H04W 36/0055* (2013.01); *H04W 36/08* (2013.01);
(Continued)

(58) Field of Classification Search
CPC ..... H04W 36/08; H04W 36/04; H04W 76/77; H04W 74/0833; H04W 88/02; H04M 1/72519; H04M 1/72522
(Continued)

(56) References Cited

U.S. PATENT DOCUMENTS

| 9,392,464 B2* | 7/2016 | Stewart | H04W 16/14 |
| 2012/0322499 A1* | 12/2012 | Wei | H04W 36/24 |
| | | | 455/525 |

(Continued)

FOREIGN PATENT DOCUMENTS

WO 2013/144614 A1 10/2013

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); 3GPP TS36.300 V13.1.0; Sep. 2015; pp. 1-254; Release 13; 3GPP Organizational Partners.
Huawei et al.; "Discussion on RRC Connection Suspension and Resumption"; 3GPP TSG-RAN WG2 NB-IOT ad-hoc Meeting; R2-160431; Jan. 19-21, 2016; pp. 1-5; Budapest, Hungary.
Etri; "Discussion on the Unique eNB ID for NB-IOT UP Solution"; 3GPP TSG-RAN WG2 NB-IOT Ad-hoc Meeting; R2-160508; Jan. 19-21, 2016; pp. 1-4; Budapest, Hungary.
MediaTek Inc.; "NB-IOT—RRC Procedures"; 3GPP TSG RAN WG2 NB-IOT Ad-hoc Meeting; R2-160506; Jan. 19-21, 2016; pp. 1-3; Budapest, Hungary.

*Primary Examiner* — Danh C Le
(74) *Attorney, Agent, or Firm* — Studebaker & Brackett PC

(57) ABSTRACT

A communication method according to an embodiment includes transmitting first information for causing a user terminal to hold context information of the user terminal from a network to the user terminal in a radio resource control (RRC) connected state. The context information includes a cell-radio network temporary identifier (C-RNTI) allocated to the user terminal. The user terminal holds the context information without discarding the context information, based on the first information, even if the user terminal transitions from the RRC connected state.

4 Claims, 9 Drawing Sheets

(51) Int. Cl.
*H04W 36/08* (2009.01)
*H04W 52/02* (2009.01)
*H04W 36/00* (2009.01)
*H04W 76/27* (2018.01)
*H04W 74/08* (2009.01)
*H04W 76/19* (2018.01)

(52) U.S. Cl.
CPC ....... *H04W 52/02* (2013.01); *H04W 74/0833* (2013.01); *H04W 76/10* (2018.02); *H04W 76/27* (2018.02); *H04W 36/0033* (2013.01); *H04W 76/19* (2018.02)

(58) Field of Classification Search
USPC ................ 455/437, 436, 550.1; 370/331
See application file for complete search history.

(56) References Cited

U.S. PATENT DOCUMENTS

| | | | |
|---|---|---|---|
| 2013/0028326 A1* | 1/2013 | Moriya | H04N 19/176 375/240.16 |
| 2014/0092771 A1* | 4/2014 | Siomina | H04W 24/08 370/252 |
| 2015/0249950 A1* | 9/2015 | Teyeb | H04W 36/0016 455/437 |
| 2015/0319774 A1* | 11/2015 | Cai | H04W 72/14 370/329 |
| 2016/0044518 A1* | 2/2016 | Centonza | H04W 24/02 370/328 |
| 2017/0086131 A1* | 3/2017 | Gupta | H04W 48/14 |
| 2018/0077624 A1* | 3/2018 | Jung | H04W 36/03 |

* cited by examiner

COMMUNICATION METHOD, RADIO TERMINAL, AND BASE STATION

RELATED APPLICATION

This application is a continuation application of international application PCT/JP2017/002587, filed Jan. 25, 2017, which claims the benefit of Japanese Patent Application No. 2016-011916 filed Jan. 25, 2017, the entire contents of which are incorporated herein by reference.

TECHNICAL FIELD

The present disclosure relates to a communication method, and a radio terminal and a base station used in a communication system.

BACKGROUND ART

The 3rd Generation Partnership Project (3GPP), which is a standardization project of a mobile communication system, is developing the specification for enhancing Long Term Evolution (LTE) so as to respond to rapidly increasing traffic demand.

In the LTE, a radio resource control (RRC) idle state and an RRC connected state are defined as an RRC state of a radio terminal. The radio terminal transitions the RRC state between the RRC idle state and the RRC connected state.

SUMMARY

A communication method according to an embodiment includes transmitting first information for causing a user terminal to hold context information of the user terminal from a network to the user terminal in a radio resource control (RRC) connected state. The context information includes a cell-radio network temporary identifier (C-RNTI) allocated to the user terminal. The user terminal holds the context information without discarding the context information, based on the first information, even if the user terminal transitions from the RRC connected state.

A radio terminal according to an embodiment includes a controller configured to transition an RRC state between an RRC idle state and an RRC connected state. The controller is configured to perform control to transition from the RRC connected state to another RRC state, which is different from the RRC idle state, after communication of user data with a base station in the RRC connected state is ended. The another RRC state is a state in which context information of the radio terminal is stored in the base station and transmission of a predetermined radio signal between the radio terminal and the base station is further restricted or exempted as compared with the RRC connected state.

A base station according to an embodiment includes a controller configured to control communication of user data with a radio terminal that transitions an RRC state between an RRC idle state and an RRC connected state. After the communication of the user data is ended, if the radio terminal transitions from the RRC connected state to another RRC state that is different from the RRC idle state, the controller is configured to continue to store context information of the radio terminal without discarding the context information. The another RRC state is a state in which the context information is stored in the base station and transmission of a predetermined radio signal between the radio terminal and the base station is further restricted or exempted as compared with the RRC connected state.

A base station according to an embodiment includes a controller configured to perform control to receive, from another base station, context information of a radio terminal in an RRC idle state or another RRC state in the another base station, and a receiver configured to receive, from the radio terminal, a connection request for requesting a connection to the cell. The controller is configured to control a connection of the radio terminal to the cell based on the context information. The third state is a state in which the context information is stored in the base station and transmission of a predetermined radio signal between the radio terminal and the base station is further restricted or exempted as compared with the RRC connected state.

DESCRIPTION OF EMBODIMENTS

Overview of Embodiment

Figure 1:
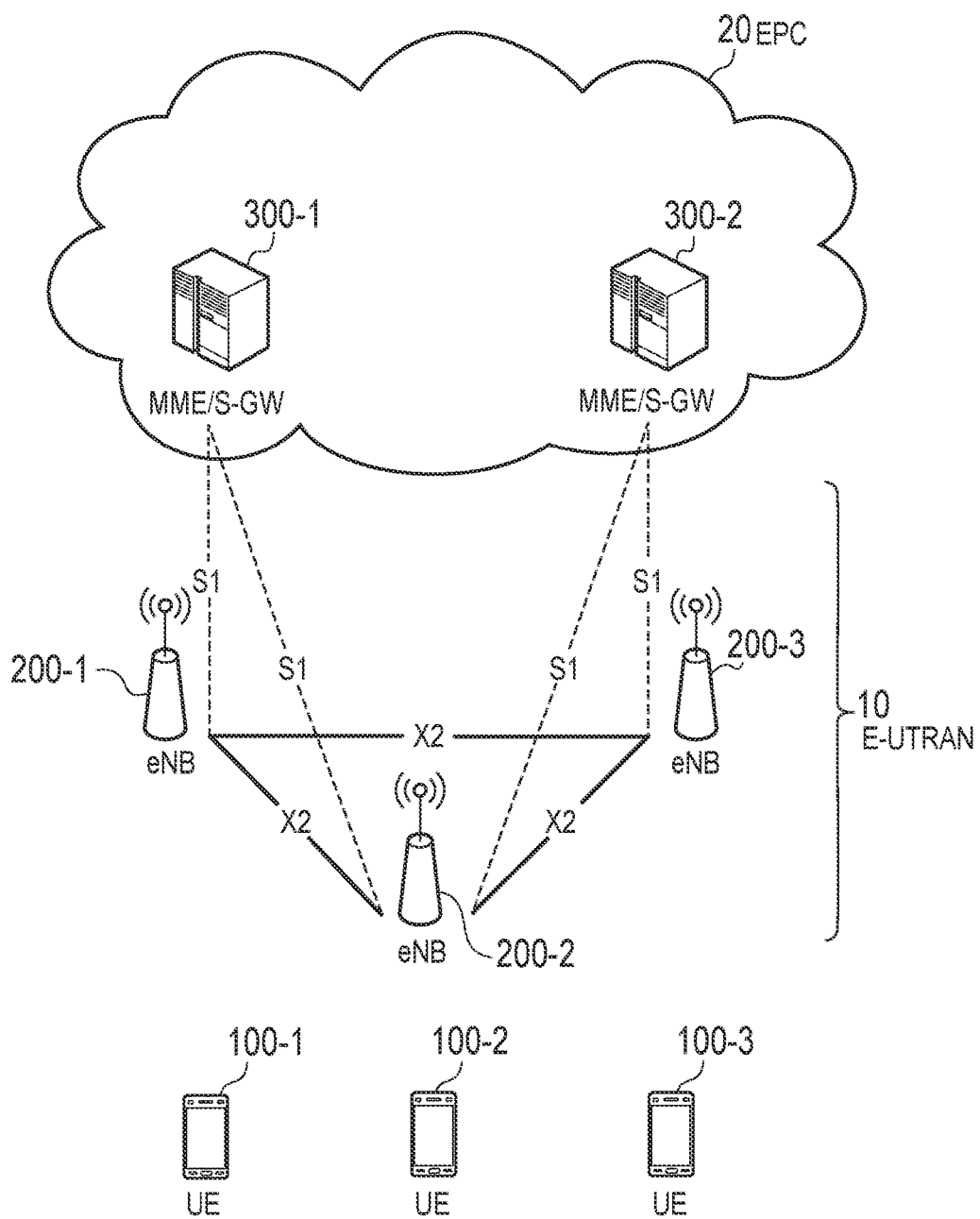
FIG. 1 is a diagram illustrating an architecture of an LTE system.

A communication method according to an embodiment includes transmitting first information for causing a user terminal to hold context information of the user terminal from a network to the user terminal in a radio resource control (RRC) connected state. The context information includes a cell-radio network temporary identifier (C-RNTI) allocated to the user terminal. The user terminal holds the context information without discarding the context information, based on the first information, even if the user terminal transitions from the RRC connected state.

The user terminal may include, into message 3 in a random access procedure, predetermined information for promoting a use of the context information. The message 3 may be transmitted from the user terminal to the network.

Even in a case of transitioning from the RRC connected state, information indicating that the user terminal supports an operation of holding the context information without discarding the context information may be transmitted from the user terminal to the network.

Information indicating whether a base station constituting the network supports a use of the context information when the RRC connection with the network is established may be transmitted in a cell.

The user terminal may be configured to transmit, to the network, predetermined information for promoting the use of the context information, based on the information.

Predetermined information for promoting a use of the context information may be transmitted from the user terminal to the network. The network may be configured to determine whether to restart the RRC connection in the user terminal.

Even after the user terminal transitions from the RRC connected state, a connection between a base station constituting the network and a mobility management entity (MME) may be held.

After the user terminal transitions from the RRC connected state, a base station constituting the network may be configured to transmit a paging message from the base station to the user terminal in response to reception of user data to be transmitted to the user terminal.

In order to reduce the number of signalings if the radio terminal transitions from the RRC idle state to the RRC connected state, a method by which the radio terminal maintains the RRC connected state as much as possible is under consideration.

However, in the RRC connected state, even If there is no user data to be communicated, a predetermined radio signal (for example, a sounding reference signal (SRS) or the like) is transmitted between the radio terminal and the base station.

The radio terminal according to the embodiment includes a controller that transitions the RRC state between the RRC idle state and the RRC connected state. After the communication of the user data with the base station in the RRC connected state is ended, the controller performs control to transition from the RRC connected state to another RRC state that is different from the RRC idle state. The another RRC state is a state in which context information of the radio terminal is stored in the base station and the transmission of the predetermined radio signal between the radio terminal and the base station is further restricted or exempted as compared with the RRC connected state.

The controller may start a timer if communication of the user data is ended. The controller may perform control to transition to the another RRC state if the timer expires.

The controller may perform control to reduce the transmission frequency of the predetermined radio signal in the another RRC state, as compared with a case in which the radio terminal is in the RRC connected state. The predetermined radio signal may be at least one of a sounding reference signal and a radio signal for reporting channel state information to the base station.

The controller may start a UL timer if the last user data is transmitted to the base station. If the UL timer expires, the controller may perform control to reduce the transmission frequency of the sounding reference signal after transitioning to the another RRC state. The controller may start a DL timer if the last user data is received from the base station. If the DL timer expires, the controller may perform control to reduce the transmission frequency of the radio signal for reporting channel state information to the base station after transitioning to the another RRC state.

The controller may start a first timer and a second timer after the communication of the user data is ended. The controller may perform control to reduce the transmission frequency of the predetermined radio signal if the first timer expires. The controller may perform control to stop transmitting the predetermined radio signal if the second timer expires.

The radio terminal may further include a receiver that receives, from the base station, information for notifying the radio terminal that the base station holds the context information without discarding the context information. The controller may perform control to transition to the another RRC state based on the information.

The controller may perform control to omit transmitting a measurement report of the radio signal to the base station in the another RRC state.

The controller may perform control to transmit, to the base station, information for notifying the base station that the radio terminal performs cell reselection.

The controller may perform control to transmit, to the base station, information for identifying a reselected cell if the cell reselection is performed in the another RRC state.

The controller may perform cell reselection in the third state or after transitioning from the third state to the RRC idle state. The controller may perform control to transmit, to the reselected cell, information for promoting the use of the context information if the communication of the user data is newly started in the reselected cell.

The radio terminal may further include a receiver that receives, from the reselected cell, information for determining whether the context information can be used in the reselected cell. The controller may perform control to transmit, to the reselected cell, information for promoting the use of the context information only if the context information can be used in the reselected cell.

The base station according to the embodiment includes a controller that controls communication of user data with the radio terminal that transitions the RRC state between the RRC idle state and the RRC connected state. If the radio terminal transitions from the RRC connected state to the another RRC state different from the RRC idle state after the communication of the user data is ended, the controller continues to store the context information of the radio terminal without discarding the context information. The another RRC state is a state in which context information is stored in the base station and the transmission of the predetermined radio signal between the radio terminal and the base station is further restricted or exempted as compared with the RRC connected state.

The controller may include a timer that determines whether the radio terminal has transitioned from the RRC connected state to the another RRC state.

The base station may further include a transmitter that transmits, to the radio terminal, the information for notifying the radio terminal that the base station holds the context information without discarding the context information.

The predetermined radio signal may be at least one of a sounding reference signal and a radio signal for reporting channel state information to the base station.

The base station may further include a receiver that receives, from the radio terminal, information for notifying the base station that the radio terminal performs cell reselection. The controller may stop the handover procedure for the radio terminal.

The base station may further include a receiver that receives, from the radio terminal in the third state, information for identifying a cell reselected by the radio terminal. The controller may perform control to transmit the context information of the radio terminal to another base station that manages the reselected cell based on the information.

The controller may perform the handover procedure for handing over the radio terminal to the reselected cell if the another base station rejects holding of the context information.

The base station according to the embodiment includes a controller that performs control to receive, from the another base station, the context information of the radio terminal in the RRC idle state or the another RRC state in the another base station, and a receiver that receives, from the radio terminal, a connection request for requesting the connection to the cell. The controller controls the connection of the radio terminal to the cell based on the context information. The third state is a state in which context information is stored in the base station and the transmission of the predetermined radio signal between the radio terminal and the base station is further restricted or exempted as compared with the RRC connected state.

The receiver may receive, from the radio terminal, information for promoting the use of the context information. If the controller receives the information, the controller may control the connection of the radio terminal to the cell based on the context information.

If the holding of the context information is rejected, the controller may perform control to transmit, to the another base station, a response for rejecting the holding of the context information.

The transmitter that transmits information for determining whether the context information can be used in the cell managed by the base station may be further provided.

First Embodiment (Mobile Communication System)

Hereinafter, an LTE system that is a mobile communication system according to an embodiment will be described. FIG. 1 is a diagram illustrating an architecture of an LTE system.

As illustrated in FIG. 1, the LTE system includes a user equipment (UE) 100, an evolved universal terrestrial radio access network (E-UTRAN) 10, and an evolved packet core (EPC) 20.

The UE 100 corresponds to a radio terminal. The UE 100 is a mobile communication apparatus. The UE 100 performs radio communication with a cell (serving cell). The architecture of the UE 100 will be described later.

The E-UTRAN 10 corresponds to a radio access network. The E-UTRAN 10 includes an evolved Node-B (eNB) 200. The eNB 200 corresponds to a base station. The eNBs 200 are connected to each other via an X2 interface. The architecture of the eNB 200 will be described later.

The eNB 200 manages one or more cells. The eNB 200 performs radio communication with the UE 100 that has established connection with the cell. The eNB 200 has a radio resource management (RRM) function, a user data (hereinafter, simply referred to as "data") routing function, a measurement control function for mobility control and scheduling, and the like. The "cell" is used as the term indicating the smallest unit of the radio communication area. The "cell" is also used as the term indicating the function of performing radio communication with the UE 100.

The EPC 20 corresponds to a core network. The EPC 20 includes a mobility management entity (MME)/serving-gateway (S-GW) 300. The MME performs various types of mobility control or the like on the UE 100. The S-GW performs data transfer control. The MME/S-GW 300 is connected to the eNB 200 via an S1 interface. The E-UTRAN 10 and the EPC 20 constitute a network.

Figure 2:
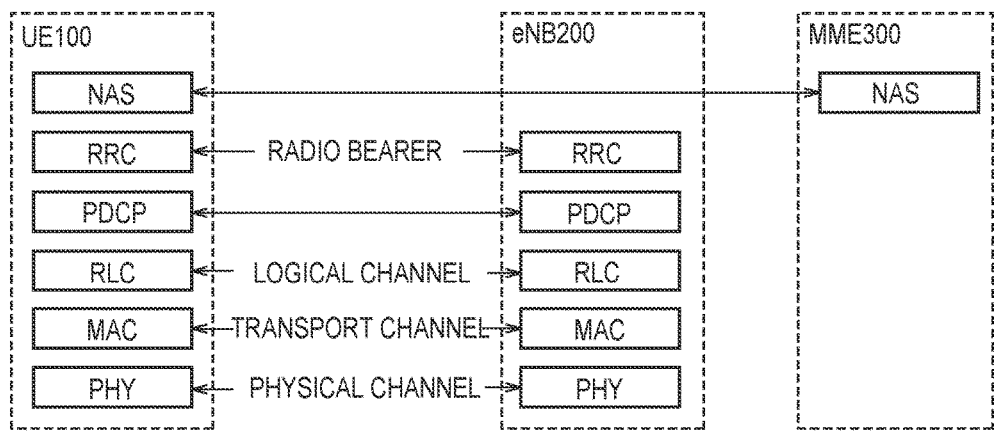
FIG. 2 is a protocol stack diagram of a radio interface in the LTE system.

FIG. 2 is a protocol stack diagram of a radio interface in the LTE system. As illustrated in FIG. 2, a radio interface protocol is divided into first to third layers of an open systems interconnection (OSI) reference model. The first layer is a physical (PHY) layer. The second layer includes a medium access control (MAC) layer, a radio link control (RLC) layer, and a packet data convergence protocol (PDCP) layer. The third layer includes a radio resource control (RRC) layer.

The PHY layer performs coding and decoding, modulation and demodulation, antenna mapping and demapping, and resource mapping and demapping. Data and control signals are transmitted between the PHY layer of the UE 100 and the PHY layer of the eNB 200 via a physical channel.

The MAC layer performs priority control of data, a retransmission process by hybrid ARQ (HARQ), a random access procedure, and the like. Data and control signals are transmitted between the MAC layer of the UE 100 and the MAC layer of the eNB 200 via a transport channel. The MAC layer of the eNB 200 includes a scheduler that determines uplink and downlink transport formats (transport block size, modulation and coding scheme (MCS)) and resource blocks allocated to the UE 100.

The RLC layer transmits data to the RLC layer on the receiving side by using the functions of the MAC layer and the PHY layer. Data and control signals are transmitted between the RLC layer of the UE 100 and the RLC layer of the eNB 200 via a logical channel.

The PDCP layer performs header compression and decompression, and encryption and decryption.

The RRC layer is defined only in a control plane that handles the control signals. A message (RRC message) for various configurations is transmitted between the RRC layer of the UE 100 and the RRC layer of the eNB 200. The RRC layer controls logical channels, transport channels, and physical channels in response to establishment, re-establishment, and release of radio bearers. If there is a connection (RRC connection) between the RRC of the UE 100 and the RRC of the eNB 200, the UE 100 is in an RRC connected mod (connected state). If there is no connection (RRC connection) between the RRC of the UE 100 and the RRC of the eNB 200, the UE 100 is in the RRC idle state (idle state).

A non-access stratum (NAS) layer, which is located above the RRC layer, performs session management, mobility management, and the like.

Figure 3:
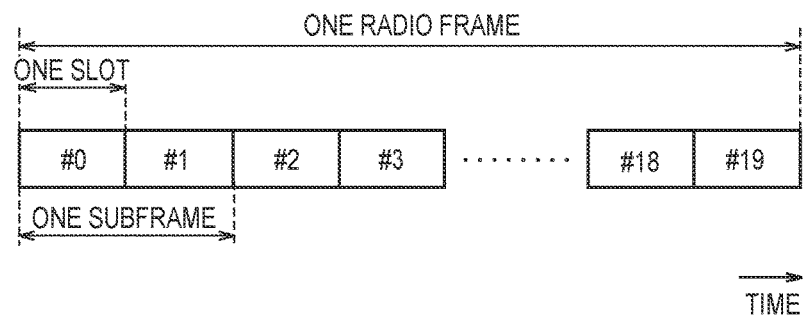
FIG. 3 is a configuration diagram of a radio frame used in the LTE system.

FIG. 3 is a configuration diagram of a radio frame used in the LTE system. In the LTE system, orthogonal frequency division multiple access (OFDMA) is applied to downlink, and single carrier frequency division multiple access (SC-FDMA) is applied to uplink.

As illustrated in FIG. 3, the radio frame includes ten subframes arranged in a time direction. Each subframe includes two slots arranged in the time direction. The length of each subframe is 1 ms. The length of each slot is 0.5 ms. Each subframe includes a plurality of resource blocks (RB) in a frequency direction and includes a plurality of symbols in the time direction. Each resource block includes a plurality of subcarriers in the frequency direction. One symbol and one subcarrier constitute one resource element (RE). Among the radio resources (time and frequency resources) allocated to the UE 100, the frequency resource can be specified by the resource block and the time resource can be specified by the subframe (or slot).

In the downlink, a section of several symbols in the head of each subframe is a region that is mainly used as a physical downlink control channel (PDCCH) for transmitting a downlink control signal. The remaining portion of each subframe is an area that can be mainly used as a physical downlink shared channel (PDSCH) for transmitting downlink data.

In the uplink, both end portions in the frequency direction in each subframe is a region that is mainly used as a physical uplink control channel (PUCCH) for transmitting a uplink control signal. The remaining portion of each subframe is an area that can be mainly used as a physical uplink shared channel (PUSCH) for transmitting uplink data. Furthermore, a demodulation reference signal (DMRS) and a sounding reference signal (SRS) are arranged in each subframe.

The PUCCH carries a control signal. The control signal is, for example, a channel quality indicator (CQI), a precoding matrix indicator (PMI), a rank indicator (RI), a scheduling request (SR), ACK/NACK, and the like. The CQI is information indicating downlink channel quality and is used to determine a recommended modulation scheme and a coding rate to be used for downlink transmission, and the like. The PMI is information indicating a precoder matrix that is preferably used for downlink transmission. The RI is information indicating the number of layers (number of streams) that is usable for downlink transmission. The SR is information requesting allocation of uplink radio resources (resource blocks). The ACK/NACK is information indicating whether the decoding of the signal transmitted via the downlink physical channel (for example, PDSCH) is successful.

(Radio Terminal)

Figure 4:
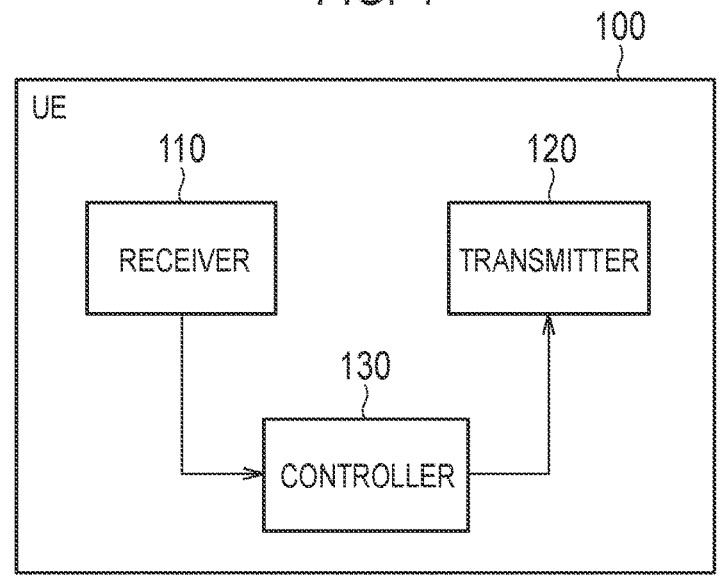
FIG. 4 is a block diagram of a UE 100.

Hereinafter, a UE 100 (radio terminal) according to an embodiment will be described. FIG. 4 is a block diagram of the UE 100. As illustrated in FIG. 4, the UE 100 includes a receiver 110, a transmitter 120, and a controller 130. The receiver 110 and the transmitter 120 may be an integrated transceiver.

The receiver 110 performs a variety of reception under the control of the controller 130. The receiver 110 includes an antenna. The receiver 110 converts a radio signal received by the antenna into a baseband signal (reception signal) and outputs the baseband signal to the controller 130.

The transmitter 120 performs a variety of transmission under the control of the controller 130. The transmitter 120 includes an antenna. The transmitter 120 converts a baseband signal (transmission signal) output by the controller 130 into a radio signal and transmits the radio signal from the antenna.

The controller 130 performs a variety of control on the UE 100. The controller 130 includes a processor and a memory. The memory stores a program executed by the processor and information used for processing by the processor. The processor includes a baseband processor that performs modulation and demodulation, coding and decoding, and the like of the baseband signal, and a central processing unit (CPU) that performs a variety of processes by executing a program stored in the memory. The processor may include a codec that performs coding and decoding of an audio or video signal. The processor performs various processes to be described later and the above-described various communication protocols.

The UE 100 may include a global navigation satellite system (GNSS) receiver. The GNSS receiver receives a GNSS signal and outputs a received signal to the controller 130 so as to acquire position information indicating a geographical position of the UE 100. Alternatively, the UE 100 may have a GPS function of acquiring the position information of the UE 100.

At least one of the receiver 110, the transmitter 120, and the controller 130 included in the UE 100 performs the process (operation) performed by the UE 100 described below, but for the sake of convenience, it will be described as the process performed by the UE 100.

(Base Station)

Figure 5:
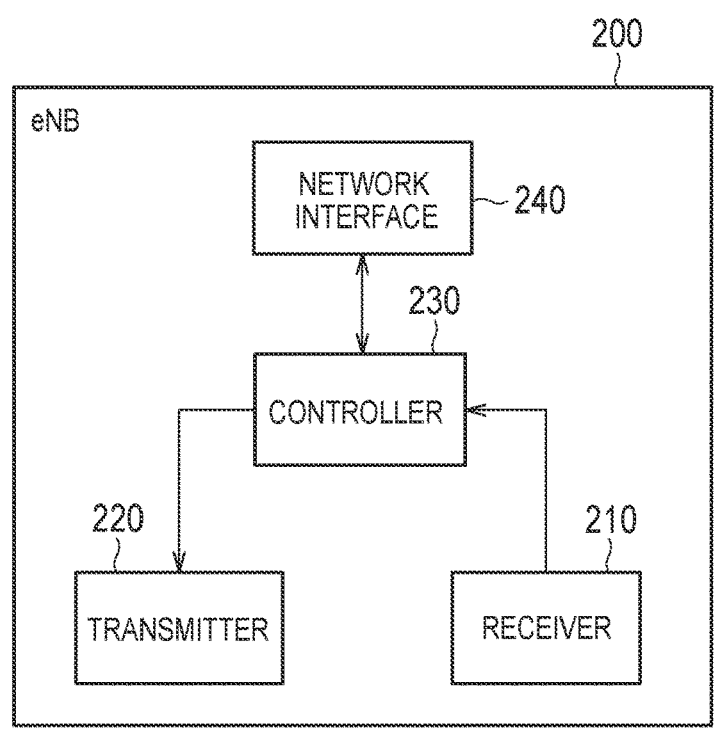
FIG. 5 is a block diagram of an eNB 200.

Hereinafter, an eNB 200 (base station) according to an embodiment will be described. FIG. 5 is a block diagram of the eNB 200. As illustrated in FIG. 5, the eNB 200 includes a receiver 210, a transmitter 220, a controller 230, and a network interface 240. The transmitter 210 and the receiver 220 may be an integrated transceiver.

The receiver 210 performs a variety of reception under the control of the controller 230. The receiver 210 includes an antenna. The receiver 210 converts a radio signal received by the antenna into a baseband signal (reception signal) and outputs the baseband signal to the controller 230.

The transmitter 220 performs a variety of transmission under the control of the controller 230. The transmitter 220 includes an antenna. The transmitter 220 converts a baseband signal (transmission signal) output by the controller 230 into a radio signal and transmits the radio signal from the antenna.

The controller 230 performs a variety of control on the eNB 200. The controller 230 includes a processor and a memory. The memory stores a program executed by the processor and information used for processing by the processor. The processor includes a baseband processor that performs modulation and demodulation, coding and decoding, and the like of the baseband signal, and a central processing unit (CPU) that performs a variety of processes by executing a program stored in the memory. The processor performs various processes to be described later and the above-described various communication protocols.

The network interface 240 is connected to the neighbour eNB 200 via an X2 interface and connected to the MME/S-GW 300 via an S1 interface. The network interface 240 is used for communication performed on the X2 interface, communication performed on the S1 interface, and the like.

At least one of the transmitter 210, the receiver 220, the controller 230, and the network interface 240 included in the eNB 200 performs the process (operation) performed by the eNB 200 described below, but for the sake of convenience, it will be described as the process performed by the eNB 200.

(RRC State)

An RRC state will be described now. In the present embodiment, the RRC state includes not only an RRC idle state (a first RRC state) and an RRC connected state (a second RRC state) but also a third RRC state. In the following, the third RRC connected state is referred to as an RRC semi-connected state. The third RRC connected state may be referred to as an RRC semi-idle state. The RRC semi-connected state is a state that is different from the RRC idle state and the RRC connected state.

(A) RRC Idle State

The RRC idle state is a state in which an RRC connection has not been established between the UE 100 and the eNB 200. That is, the UE 100 does not have an RRC connection (E-UTRAN-RRC connection). In the RRC idle state, the following control (operation) is performed.

In the RRC idle state, the RRC context is not stored in the eNB 200. The E-UTRAN 10 does not know the cell to which the UE 100 belongs. The RRC context is (at least a part of) the context information of the UE 100. The UE 100 does not have a context in the E-UTRAN 10 (at least UE-specific individual configuration information and a temporary identifier (C-RNTI: cell-radio network temporary identifier) allocated to the UE 100).

The communication of user data is not performed between the UE 100 and the eNB 200. The UE 100 cannot transmit a scheduling request (SR) and a buffer status report (BSR) to the eNB 200.

The UE 100 cannot transmit, to the eNB 200, a sounding reference signal (SRS) used for channel (in particular, uplink channel) estimation between the UE 100 and the eNB 200. The UE 100 cannot transmit, to the eNB 200, a radio signal (CSI feedback) for reporting channel state information (CSI) to the eNB 200.

The UE 100 performs a public land mobile network (PLMN) selection. The UE 100 performs a cell reselection operation (cell re-selection mobility).

In the RRC idle state, the handover procedure is not performed. Therefore, the UE 100 cannot transmit the measurement report of the radio signal to the eNB 200. The UE 100 cannot receive, from the eNB 200, a handover command for handover to another cell.

Discontinuous reception (DRX) (or extended DRX) for discontinuous reception operation can be configured to the UE 100 by non-access stratum (NAS). The DRX (or extended DRX) in the RRC idle state can be applied to the UE 100 in the RRC idle state. In this case, the UE 100 discontinuously receives (monitors) a paging message.

The UE 100 cannot perform carrier aggregation (CA). The UE 100 cannot perform dual connectivity (DC). The UE 100 cannot perform WLAN aggregation.

The UE 100 can perform traffic steering (and network selection) between the E-UTRAN 10 and the WLAN. The traffic steering (and network selection) is performed in units of access point name (APN). The UE 100 performs traffic steering based on auxiliary information (RAN assistance parameters). The UE 100 in the RRC idle state applies the auxiliary information acquired via dedicated signaling in the RRC connected state until another cell is selected (reselected). If another cell is selected (reselected), the UE 100 in the RRC idle state applies the auxiliary information acquired from the another cell by broadcast signaling (for example, a system information block (SIB)).

The eNB 200 cannot perform semi-persistent scheduling (SPS) that semi-persistently allocates radio resources to the UE 100.

The UE 100 does not perform a radio link monitor (RLM). The UE 100 does not monitor a radio link failure.

If the UE 100 is close to a CSG member cell, the UE 100 cannot transmit, to the eNB 200, a proximity indication that is provided to the source eNB 200.

The UE 100 cannot transmit, to the eNB 200, an IDC indication for notifying the E-UTRAN 10 of a problem (in-device coexistence (IDC) problem) in which interference occurs due to coexistence of a plurality of transceivers in the UE 100.

The UE 100 cannot transmit, to the eNB 200, UE assistance information for notifying the E-UTRAN 10 that the UE 100 gives priority to power saving.

The UE 100 cannot transmit, to the eNB 200, a multimedia broadcast/multicast service (MBMS) interest indication for notifying the E-UTRAN 10 that the UE 100 is receiving an MBMS service or is interested in receiving the MBMS service.

The UE 100 cannot transmit, to the eNB 200, sidelink UE information for notifying the E-UTRAN 10 (eNB 200) of sidelink information about sidelink, which is a direct exchange of radio signals between terminals. The sidelink information includes, for example, at least one of information for notifying the E-UTRAN 10 (eNB 200) that it is interested in receiving sidelink communication or discovery or is no longer interested therein, information for requesting allocation or release of resources for sidelink communication or discovery announcement, and information for reporting parameters related to sidelink operation from system information of inter-frequency cells different from the serving cell.

(B) RRC Connected State

The RRC connected state is a state in which an RRC connection is established between the UE 100 and the eNB 200. That is, the UE 100 has an RRC connection. In the RRC connected state, the following control (operation) is performed.

In the RRC connected state, the RRC context is stored in the eNB 200. The E-UTRAN 10 knows the cell to which the UE 100 belongs. The UE 100 has a context in the E-UTRAN 10.

The communication of user data is performed between the UE 100 and the eNB 200. The UE 100 can transmit a scheduling request (SR) and a buffer status report (BSR) to the eNB 200.

The UE 100 can transmit a sounding reference signal (SRS) to the eNB 200. The UE 100 can transmit, to the eNB 200, a radio signal (CSI feedback) for reporting channel state information to the eNB 200. The UE 100 generates channel state information (CSI) based on a signal (particularly, a reference signal) received by the receiver 110, and feeds the channel state information back to the eNB 200 (serving cell). The channel state information includes a precoding matrix indicator (PMI), a rank indicator (RI), a channel quality indicator (CQI), and the like.

UE 100 cannot perform PLMN selection. The UE 100 cannot perform a cell reselection operation.

In the RRC connected state, the handover procedure is performed. Therefore, the UE 100 can transmit a measurement report of the radio signal to the eNB 200. The UE 100 can receive a handover command from the eNB 200.

For the UE 100, DRX (or extended DRX) can be configured by at least one of the NAS and the E-UTRAN 10 (eNB 200). The DRX (or extended DRX) in the RRC connected state can be applied to the UE 100 in the RRC connected state. In this case, the UE 100 discontinuously receives (monitors) the PDCCH.

In the RRC connected state, carrier aggregation (CA) can be performed. In the CA, two or more component carriers are integrated to support a wider transmission bandwidth. The UE 100 performs communication by simultaneously using a plurality of component carriers (a plurality of serving cells). In the CA, a cell that provides predetermined information if the UE 100 starts an RRC connection is referred to as a primary cell (PCell). For example, the primary cell provides NAS mobility information (for example, tracking area identity (TAI)) at the time of RRC connection establishment/reestablishment/handover, and provides security information at the time of RRC connection reestablishment/handover. On the other hand, an auxiliary serving cell paired with the primary cell is referred to as a secondary cell (SCell). The secondary cell is formed together with the primary cell. In the CA, the UE 100 has only one RRC connection with the network.

In the RRC connected state, the UE 100 can perform dual connectivity (DC). In the DC, radio resources are allocated from a plurality of eNBs 200 to the UE 100. The eNBs 200 are constituted by a master eNB (MeNB) and a secondary eNB (SeNB). The master eNB is an eNB 200 that terminates at least an S1-MME (S1 for a control plane) interface in the DC. The SeNB is an eNB 200 that provides additional radio resources for the UE 100 in the DC, but is not MeNB.

The DC is a mode of operation of the UE 100 in the RRC connected state, which is configured with a master cell group and a secondary cell group. The master cell group is a group of serving cells associated with the MeNB in the DC. The master cell group consists of a PCell and optionally one or more SCells. The secondary cell group is a group of serving cells associated with the SeNB in the DC. The secondary cell group consists of a PCell and optionally one or more SCells.

In the RRC connected state, WLAN aggregation can be performed. The WLAN aggregation performs the same operation as carrier aggregation, but at least a part of a plurality of component carriers is constituted by carriers in wireless local area network (WLAN). In the WLAN aggregation, cellular communication (LTE communication) and WLAN communication can be used together.

The UE 100 can perform traffic steering (and network selection) between the E-UTRAN 10 and the WLAN. The UE 100 in the RRC connected state applies auxiliary information acquired from the serving cell via dedicated signaling. If the UE 100 has not obtained the auxiliary information from the serving cell via the dedicated signaling, the UE 100 applies auxiliary information acquired via broadcast signaling.

The eNB 200 can perform semi-persistent scheduling (SPS) that semi-persistently allocates radio resources to the UE 100.

The UE 100 can perform a radio link monitor (RLM). The UE 100 can monitor a radio link failure.

The UE 100 can transmit a proximity indication to the eNB 200. The UE 100 can transmit an IDC indication to the eNB 200. The UE 100 can transmit UE assistance information to the eNB 200. The UE 100 can transmit an MBMS interest indication to the eNB 200. The UE 100 can transmit sidelink UE information to the eNB 200.

(C) RRC Semi-Connected State

In the RRC semi-connected state, the context information of the UE 100 is stored in the eNB 200. The RRC semi-connected state is a state in which the transmission of the predetermined radio signal between the UE 100 and the eNB 200 is further restricted or exempted as compared with the RRC connected state. In the RRC semi-connected state, the following control (operation) is performed.

In the RRC semi-connected state, the RRC context information can be stored in the eNB 200. Alternatively, the RRC context information may not be stored in the eNB 200. The eNB 200 can maintain a connection between the eNB 200 and the EPC 20. Specifically, the eNB 200 can maintain an S1 connection (S1-U bearer) between the eNB 200 and the MME 300. Alternatively, the eNB 200 may not be able to maintain a connection between the eNB 200 and the EPC 20. The UE 100 may have a context in the E-UTRAN 10. Alternatively, the UE 100 may not be able to have a context in the E-UTRAN 10. The E-UTRAN 10 knows the cell to which the UE 100 belongs. Alternatively, the E-UTRAN 10 may not know the cell to which the UE 100 belongs.

In the RRC semi-connected state, the communication of user data is not performed between the UE 100 and the eNB 200. If the user data to be communicated in the UE 100 is generated in the RRC semi-connected state, the UE 100 can transition from the RRC semi-connected state to the RRC connected state and transmit the user data to the eNB 200. If the user data is generated in the UE 100, the UE 100 may transmit, to the eNB 200, information indicating the transition from the RRC semi-connected state to the RRC connected state.

However, the UE 100 may be able to receive user data from the eNB 200 in the RRC semi-connected state. In this case, after receiving the user data from the eNB 200, the UE 100 transitions from the RRC semi-connected state to the RRC connected state. If the user data is generated in the eNB 200, the eNB 200 may transmit, to the UE 100, information for the UE 100 to transition to the RRC connected state. After transmitting the information, the eNB 200 may transmit the user data to the UE 100. After receiving the information, the UE 100 transitions from the RRC semi-connected state to the RRC connected state. Therefore, the UE 100 can receive the user data from the eNB 200 in the RRC connected state.

The UE 100 cannot transmit a scheduling request and a buffer status report to the eNB 200. Alternatively, the UE 100 may be able to transmit at least one of the scheduling request and the buffer status report to the eNB 200. For example, if the user data to be communicated is generated, the UE 100 may be able to transmit at least one of the scheduling request and the buffer status report in the RRC semi-connected state.

The UE 100 can transmit a sounding reference signal to the eNB 200. The UE 100 may restrict or exempt the transmission of the sounding reference signal. In this case, the sounding reference signal corresponds to the "predetermined radio signal". For example, the UE 100 may reduce the transmission frequency of the sounding reference signal, as compared with a case in which the UE 100 is in the RCC connected state. The UE 100 may stop transmitting the sounding reference signal.

The UE 100 may transmit, to the eNB 200, a radio signal (CSI feedback) for reporting channel state information. The UE 100 may restrict or exempt the transmission of the CSI feedback. In this case, the CSI feedback corresponds to the predetermined radio signal. For example, the UE 100 may reduce the transmission frequency of the CSI feedback, as compared with a case in which the UE 100 is in the RCC connected state. The UE 100 may stop transmitting the CSI feedback.

UE 100 can perform PLMN selection. Alternatively, the UE 100 may not be able to perform PLMN selection. The UE 100 can perform a cell reselection operation. Alternatively, the UE 100 may not be able to perform the cell reselection operation.

In the RRC semi-connected state, the handover procedure cannot be performed. Therefore, the UE 100 cannot transmit the measurement report of the radio signal to the eNB 200. The UE 100 cannot receive a handover command from the eNB 200. Alternatively, in the RRC semi-connected state, the handover procedure may be performed. For example, as described later, if the neighbour eNB 200 rejects to receive the context information of the UE 100, the handover procedure may be performed.

For the UE 100, DRX (or extended DRX) can be configured by at least one of the NAS (MME 300) and the E-UTRAN 10 (eNB 200). Alternatively, the UE 100 may be able to configure the DRX (or extended DRX) only by the NAS. The DRX (or extended DRX) in the RRC connected state can be applied to the UE 100. Alternatively, the DRX (or extended DRX) in the RRC idle state may be applicable to the UE 100.

In the RRC semi-connected state, carrier aggregation cannot be performed. In the UE 100, the configuration of the carrier aggregation may be deactivated (inactive). In the UE 100, the configuration of the carrier aggregation may be discarded (Deconfig.). Alternatively, in the RRC semi-connected state, the carrier aggregation may be performed. For example, the UE 100 may receive user data from eNB 200 via the carrier aggregation. After receiving the user data from the eNB 200, the UE 100 may transition from the RRC semi-connected state to the RRC connected state.

In the RRC semi-connected state, dual connectivity cannot be performed. In the UE 100, the configuration of the dual connectivity may be deactivated. In the UE 100, the configuration of the dual connectivity may be discarded. Alternatively, the dual connectivity may be performed in the RRC semi-connected state. For example, the UE 100 may receive user data from the eNB 200 via the dual connectivity. After receiving the user data from the eNB 200, the UE 100 may transition from the RRC semi-connected state to the RRC connected state.

In the RRC semi-connected state, WLAN aggregation cannot be performed. In the UE 100, the configuration of the WLAN aggregation may be deactivated. In the UE 100, the configuration of the WLAN aggregation may be discarded. Alternatively, the WLAN aggregation may be performed in the RRC semi-connected state. For example, the UE 100 may receive user data from the eNB 200 via the WLAN aggregation. After receiving the user data from the eNB 200, the UE 100 may transition from the RRC semi-connected state to the RRC connected state.

The UE 100 can perform traffic steering (and network selection) between the E-UTRAN 10 and the WLAN. The UE 100 in the RRC semi-connected state applies auxiliary information acquired from the serving cell via dedicated signaling. If the UE 100 has not obtained the auxiliary information from the serving cell via the dedicated signaling, the UE 100 applies auxiliary information acquired via broadcast signaling.

The eNB 200 cannot perform semi-persistent scheduling (SPS) that semi-persistently allocates radio resources to the UE 100. In the UE 100, the configuration of the SPS may be deactivated. In the UE 100, the configuration of the SPS may be discarded. Alternatively, the eNB 200 may be able to perform the SPS to the UE 100 in the RRC semi-connected state. For example, after the radio resource is allocated by the SPS, the UE 100 may transition from the RRC semi-connected state to the RRC connected state.

The UE 100 cannot perform a radio link monitor (RLM). Alternatively, the UE 100 may be able to perform the RLM. The UE 100 cannot monitor a radio link failure (RLF). Alternatively, the UE 100 may be able to monitor the RLF.

The UE 100 cannot transmit a proximity indication to the eNB 200. Alternatively, the UE 100 may be able to transmit the proximity indication to the eNB 200. A radio signal for transmitting the proximity indication may be included in the "predetermined radio signal".

The UE 100 cannot transmit the IDC indication to the eNB 200. Alternatively, the UE 100 may be able to transmit the IDC indication to the eNB 200. A radio signal for transmitting the IDC indication may be included in the "predetermined radio signal".

The UE 100 cannot transmit UE assistance information to the eNB 200. Alternatively, the UE 100 may be able to transmit the UE assistance information to the eNB 200. A radio signal for transmitting the UE assistance information may be included in the "predetermined radio signal".

The UE 100 cannot transmit an MBMS interest indication to the eNB 200. Alternatively, the UE 100 may be able to transmit the MBMS interest indication to the eNB 200. A radio signal for transmitting the MBMS interest indication may be included in the "predetermined radio signal".

The UE 100 cannot transmit sidelink UE information to the eNB 200. Alternatively, the UE 100 may be able to transmit sidelink UE information to the eNB 200. A radio signal for transmitting the sidelink UE information may be included in the "predetermined radio signal".

As described above, the number of signalings can be reduced by restricting or exempting the transmission of the predetermined radio signal, which the UE 100 (or eNB 200) can transmit in the RRC connected state, in the RRC semi-connected state. The operation that can be performed by the UE 100 (or the eNB 200) in the RRC connected state is restricted or exempted in the RRC semi-connected state, whereby power consumption of the UE 100 can be reduced.

Operation According to First Embodiment

Figure 6:
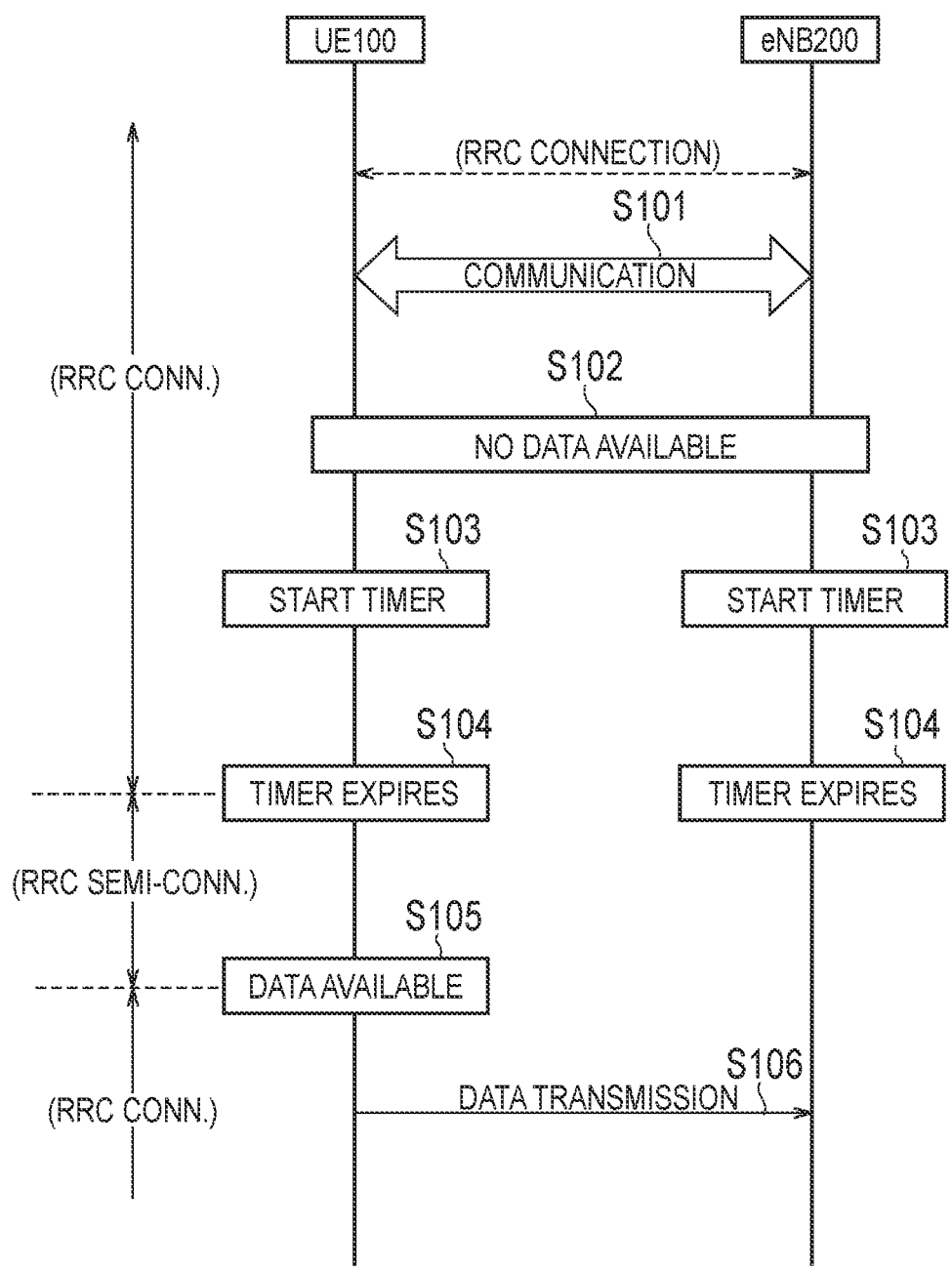
FIG. 6 is a sequence diagram for explaining an operation according to a first embodiment.

Next, an operation according to a first embodiment will be described with reference to FIG. 6. FIG. 6 is a sequence diagram for explaining an operation according to a first embodiment.

The UE 100 exists in a cell managed by the eNB 200. The UE 100 establishes an RRC connection with the eNB 200. The UE 100 is in the RRC connected state.

As illustrated in FIG. 6, in step S101, the UE 100 and the eNB 200 perform communication of user data.

In step S102, the UE 100 and the eNB 200 completes the communication of the user data. That is, there is no user data (user data to be communicated) available between the UE 100 and the eNB 200.

In step S103, the UE 100 and the eNB 200 starts the timer if the communication of the user data is ended. The timer that the UE 100 has (starts) is a timer for measuring the time to transition from the RRC connected state to the RRC semi-connected state. The timer that the eNB 200 has (starts) is a timer for determining whether the UE 100 has transitioned from the RRC connected state to the RRC semi-connected state.

The UE 100 starts the timer if the user data to be communicated does not remain in the buffer and/or the user data is not received from the eNB 200. Similarly, the eNB 200 starts the timer if the user data to be communicated does not remain in the buffer and/or the user data is not received from the UE 100. The eNB 200 may start the timer if the user data (data buffer) in the UE 100 is predicted to be zero. For example, based on the BSR received from the UE 100, if the user data corresponding to the BSR is received from the UE 100, the eNB 200 can predict that the user data in the UE 100 is zero.

If the user data to be communicated is generated, or if the user data is received from the eNB 200, the UE 100 resets the timer and restarts the timer. If the user data to be communicated is generated, or if the user data is received from the UE 100, the eNB 200 also resets the timer and restarts the timer.

Whenever each of the UE 100 and the eNB 200 transmits the user data, the timer may be reset (restarted). If the data communication is ended, the resetting of the timer does not occur. Thus, it can be determined whether the UE 100 has transitioned from the RRC connected state to the RRC semi-connected state.

The eNB 200 can configure (in advance) a timer value to the UE 100 by common signaling (for example, SIB) or dedicated signaling (for example, RRC connection reconfiguration).

In step S104, if the timer expires, the UE 100 performs control to transition to the RRC semi-connected state. Therefore, the UE 100 is in the RRC semi-connected state.

In the RRC semi-connected state, the UE 100 performs control to reduce the transmission frequency of the predetermined radio signal, as compared with a case in which the UE 100 is in the RRC connected state. For example, the predetermined radio signal is at least one of the CSI feedback (radio signal for reporting the CSI to eNB 200) and the SRS. Specifically, the UE 100 reduces the number of transmissions per unit time of the SRS and/or the CSI feedback. The UE 100 may lengthen a transmission cycle of the SRS and/or the CSI feedback. The UE 100 may not be able to transmit the SRS and/or the CSI feedback beyond an upper restrict within a predetermined time.

If transitioning from the RRC connected state to the RRC semi-connected state, the UE 100 deactivates all or part of pieces of the information configured from the eNB 200 without discarding (releasing) the information. If transitioning from the RRC connected state to the RRC semi-connected state, the UE 100 may discard (release) (at least a part of) information configured from the eNB 200.

If the timer expires, the eNB 200 determines that the UE 100 has transitioned from the RRC connected state to the RRC semi-connected state. Even if the UE 100 is not in the RRC connected state, the eNB 200 continues to store the context information of the UE 100 without discarding the context information. The eNB 200 can continue to maintain the RRC connection without releasing the RRC connection.

Here, the context information may be information for determining whether the RRC connection with the UE 100 may be restarted. The context information includes, for example, an RRC context including an identifier (C-RNTI) of the UE 100 in the eNB 200, an E-RAB context including necessary radio network layer (RNL) and transport network layer (TNL) address information (RNL and TNL addressing information), and the like. For example, the context information may include information about roaming and access restrictions provided at the time of connection establishment or at the time of the latest tracking area (TA) update. The context information may include RRC (radio layer) configuration information and RRC history information.

Even if the transmission of the SRS and/or the CSI feedback from the UE 100 decreases, the eNB 200 knows that the fact that the UE 100 is in the RRC semi-connected state is the reason for the reduction.

In step S105, the UE 100 generates user data to be communicated. The UE 100 transitions from the RRC semi-connected state to the RRC connected state.

In step S106, the UE 100 in the RRC connected state transmits the user data to the eNB 200. By receiving the user data from the UE 100, the eNB 200 can know that the UE 100 has transitioned from the RRC semi-connected state to the RRC connected state. After the information indicating the transition to the RRC connected state is transmitted to the eNB 200, the UE 100 may transmit the user data to the eNB 200.

If the UE 100 holds (at least a part of) the information configured from the eNB 200, the UE 100 may activate the configuration that is deactivated. Therefore, it is not necessary for the UE 100 to be newly configured by the eNB 200, and thus signaling can be reduced.

As described above, after the communication of the user data with the eNB 200 is ended, the UE 100 transitions from the RRC connected state to the RRC idle state. The RRC semi-connected state is a state in which the context information of the UE 100 is stored in the eNB 200 and the transmission of the predetermined radio signal between the UE 100 and the eNB 200 is further restricted or exempted as compared with the RRC connected state. Therefore, the number of signalings can be reduced more than that in the RRC connected state. Since the eNB 200 stores the context information of the UE 100, the number of signalings can be reduced, as compared with a case in which the eNB 200 transitions from the RRC idle state to the RRC connected state.

Modification 1 According to First Embodiment

Figure 7:
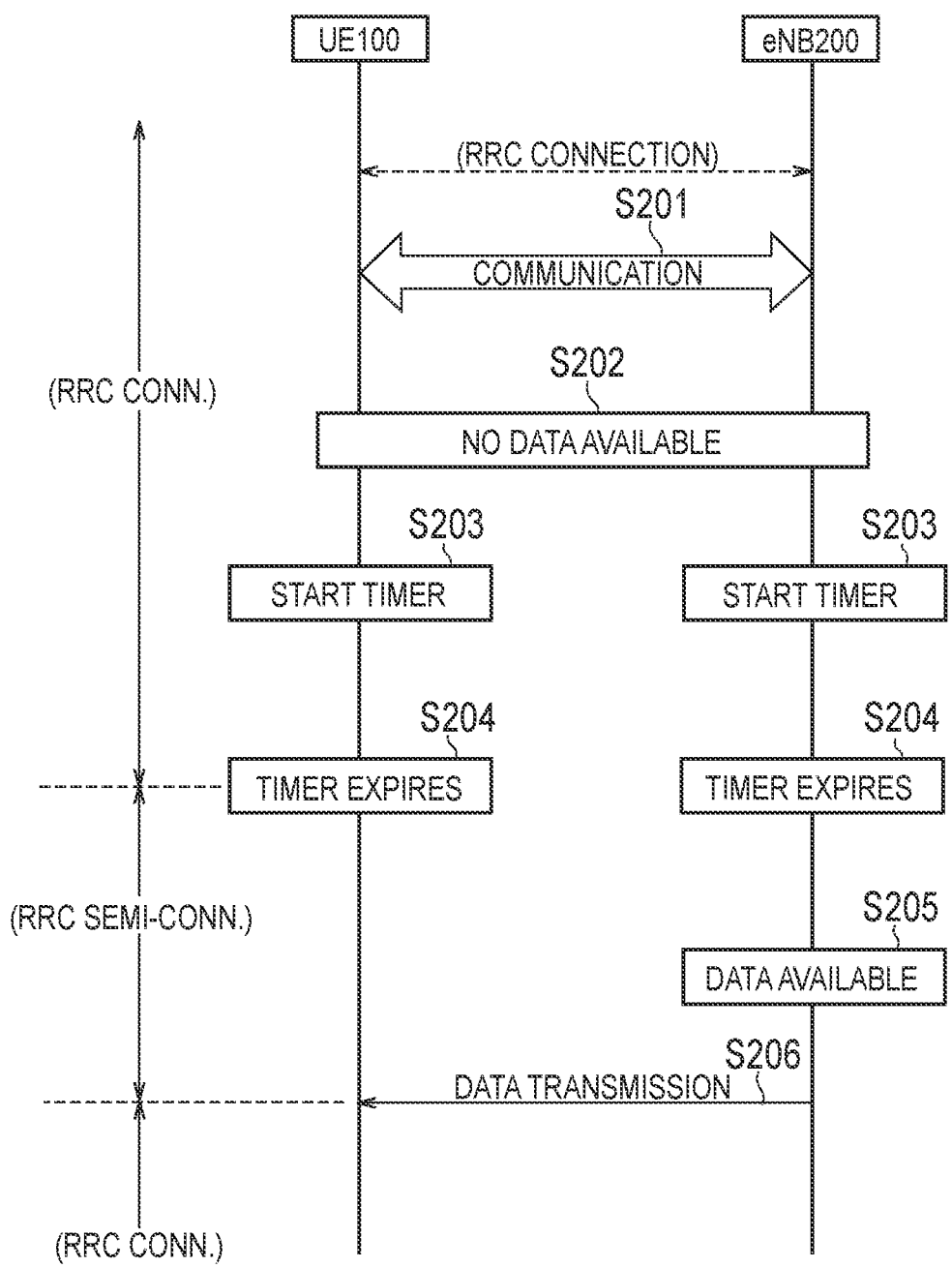
FIG. 7 is a sequence diagram for explaining modification 1 according to the first embodiment.

Next, modification 1 according to the first embodiment will be described with reference to FIG. 7. FIG. 7 is a sequence diagram for explaining modification 1 according to the first embodiment. The same parts as those described above are omitted as appropriate. In the present modification, user data to be communicated in the eNB 200 is generated.

Steps S201 to S204 correspond to steps S101 to S104.

In step S205, the eNB 200 generates user data to be communicated.

In step S206, the eNB 200 transmits the user data to the UE 100 in the RRC semi-connected state. The UE 100 receives the user data from the eNB 200. In response to reception of the user data, the UE 100 transitions from the RRC semi-connected state to the RRC connected state. As described above, even if the UE 100 is in the RRC semi-connected state, the communication may be performed between the UE 100 and the eNB 200.

Before transmitting the user data, the eNB 200 may transmit, to the UE 100, information for the UE 100 to transition to the RRC connected state. The eNB 200 may transmit the user data after transmitting the information.

Modification 2 According to First Embodiment

Next, modification 2 according to the first embodiment will be described. The same parts as those described above are omitted as appropriate.

In the first embodiment described above, the UE 100 has one timer for transitioning to the RRC connected state. In the present modification, the UE 100 has an uplink timer (UL timer) and a downlink timer (DL timer).

If the UE 100 transmits the last user data to the eNB 200, the UE 100 starts the uplink timer (UL timer). The UE 100 resets the UL timer if the user data is generated after the UL timer is started. The UE 100 restarts the UL timer if all the generated user data is transmitted to the eNB 200. If the UL timer expires, the UE 100 transitions to the RRC semi-connected state in the uplink. If the UE 100 transitions to the RRC semi-connected state in the uplink, the UE 100 can reduce the transmission frequency of the SRS. The UE 100 may stop transmitting the SRS.

On the other hand, if the last user data is received from the eNB 200, the UE 100 starts the downlink timer (DL timer). The UE 100 resets the DL timer if the UE 100 receives the user data from the eNB 200 after the DL timer is started. The UE 100 restarts the DL timer if the reception of the user data from the eNB 200 is ended. If the DL timer expires, the UE 100 transitions to the RRC semi-connected state in the downlink. If the UE 100 transitions to the RRC semi-connected state in the downlink, the UE 100 can reduce the transmission frequency of the CSI feedback. The UE 100 may stop transmitting the CSI feedback.

Like the UE 100, the eNB 200 also has a UL timer and a DL timer. If the eNB 200 receives the last user data from the UE 100, the eNB 200 starts the UL timer. If the eNB 200 receives the user data from the UE 100 after starting the UL timer, the eNB 200 resets the UL timer. If all the reception of the user data from the UE 100 is ended, the eNB 200 restarts the UL timer. If the UL timer expires, the eNB 200 can determine that the UE 100 has transitioned to the RRC semi-connected state in the uplink.

On the other hand, if the eNB 200 transmits the last user data to the UE 100, the eNB 200 starts the DL timer. After starting the DL timer, the eNB 200 resets the DL timer if user data to the UE 100 is generated. The eNB 200 restarts the DL timer if all the generated user data is transmitted to the UE 100. If the DL timer expires, the eNB 200 can determine that the UE 100 has transitioned to the RRC semi-connected state in the downlink.

As described above, the RRC semi-connected state in the uplink and the RRC semi-connected state in the downlink may exist independently as the RRC semi-connected state. Therefore, signaling can be flexibly reduced even if communication only from the eNB 200 to the UE 100 (or from the UE 100 to the eNB 200) is performed.

Modification 3 According to First Embodiment

Next, modification 3 according to the first embodiment will be described. The same parts as those described above are omitted as appropriate.

In the present modification, the UE 100 has two timers to change the restriction condition (or exemption condition) of transmission of a predetermined radio signal.

The UE 100 has a first timer and a second timer. The UE 100 starts the first timer and the second timer after the communication of the user data is ended.

If the first timer expires, the UE 100 performs control to reduce the transmission frequency of the predetermined radio signal. For example, the UE 100 reduces the transmission frequency of at least one of the SRS and the CSI feedback.

If the second timer expires, the UE 100 stops transmitting the predetermined radio signal. The UE 100 stops transmitting the predetermined radio signal with the reduced transmission frequency.

If the communication of the user data is ended, the UE 100 may start both the first timer and the second timer. In this case, the timer value of the second timer is longer than the timer value of the first timer. If the communication of the user data is restarted, the UE 100 resets and restarts the first timer and the second timer.

Alternatively, the UE 100 may start the first timer if the communication of the user data is ended, and may start the second timer if the first timer expires. If the communication of the user data is resumed, the UE 100 restarts the first timer (resets the first timer and the second timer).

Like the UE 100, the eNB 200 may have a first timer and a second timer. Since the handling of the timer in the eNB 200 is similar to that in the UE 100, a description thereof is omitted.

As described above, since the transmission of the predetermined radio signal can be reduced stepwise, the signaling can be appropriately reduced.

Second Embodiment

The second embodiment will be described below. The same parts as those described above are omitted as appropriate.

Operation According to Second Embodiment

Figure 8:
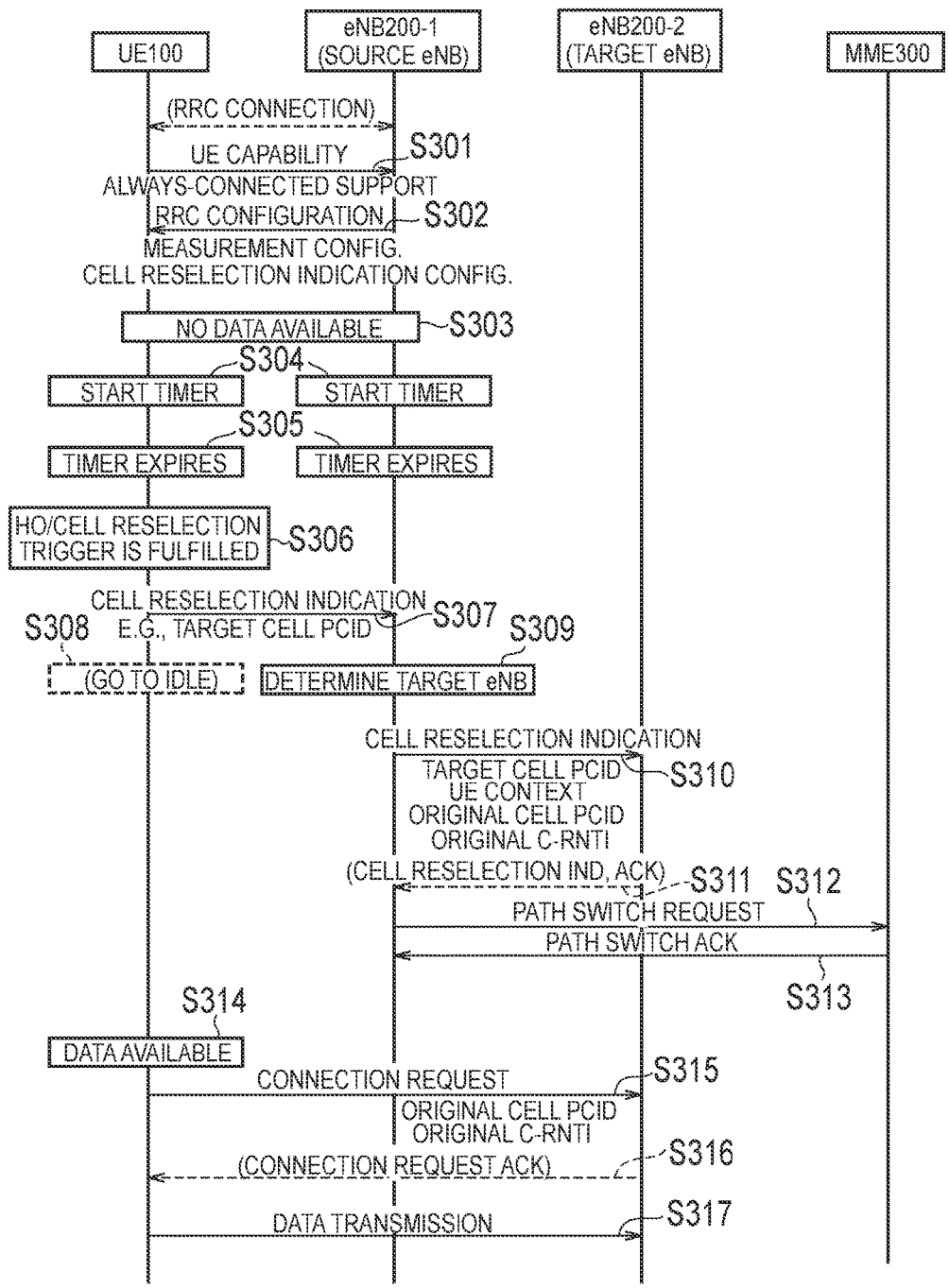
FIG. 8 is a sequence diagram for explaining an operation according to a second embodiment.

An operation according to a second embodiment will be described with reference to FIG. 8. FIG. 8 is a sequence diagram for explaining an operation according to a second embodiment. In the second embodiment, a case in which the UE 100 in the RRC semi-connected state changes the serving cell will be described.

A UE 100 exists in a cell managed by an eNB 200-1. The UE 100 establishes an RRC connection with the eNB 200-1. The UE 100 is in an RRC connected state between the UE 100 and the eNB 200-1.

As illustrated in FIG. 8, in step S301, the UE 100 transmits UE capability information to the eNB 200-1. The UE capability information includes always-connected support indicating that the UE 100 supports the RRC semi-connected state. The eNB 200-1 receives the UE capability information. Based on the UE capability information, the eNB 200-1 determines that the UE 100 supports the RRC semi-connected state.

In step S302, the eNB 200-1 transmits, to the UE 100, cell reselection information (Cell reselection indication config.) for the UE 100 to perform cell reselection in the RRC semi-connected state. The eNB 200-1 may transmit the cell reselection information only to the UE 100 that supports the RRC semi-connected state. The eNB 200-1 may transmit the cell reselection information together with the measurement configuration information (Measurement Config.) for configuring the measurement (and measurement report) of the radio signal to the UE 100. For example, the eNB 200-1 transmits, to the UE 100, RRC configuration information including measurement configuration information and cell reselection information.

The cell reselection information is information for allowing the UE 100 in the RRC semi-connected state to perform cell reselection. The cell reselection information may include information (cell reselection trigger or the like) for the UE 100 to transmit the cell reselection indication described later to the eNB 200-1. The cell reselection trigger may be the same as the existing cell reselection parameter. The cell reselection trigger may be a parameter (threshold value) that is different from the cell reselection parameter. The cell reselection information may include information about the above-mentioned timer (such as the timer value).

The cell reselection information may include identification information for identifying the UE 100 in the RRC semi-connected state. For example, the identification information may be UE X2AP ID, or may be a unique identifier (intra-TA ID) within the TA. An MME 300 assigns the intra-TA ID to the UE 100. The MME 300 may notify the UE 100 of the intra-TA ID by NAS signaling. The MME 300 may notify the UE 100 through the eNB 200-1 by the cell reselection information. The MME 300 may notify the eNB 200-1 of the intra-TA ID via an S1 interface by, for example, initial context setup or the like.

Steps S303 to S305 correspond to steps S102 to S104. After transitioning from the RRC connected state to the RRC semi-connected state in step S305, the UE 100 can perform the following operations. Alternatively, the UE 100 may transition to the RRC semi-connected state after performing the following operations (S306, S307) in the RRC connected state.

In step S306, a handover trigger is satisfied. In the present embodiment, the UE 100 performs control to omit transmitting the measurement report of the radio signal to the eNB 200-1 in the RRC semi-connected state. In the RRC connected state, the UE 100 transmits the measurement report of the radio signal to the eNB 200-1. Therefore, since the measurement report of the radio signal is not transmitted, the signaling can be reduced.

In step S306, the cell reselection trigger is satisfied. The UE 100 may perform cell reselection if the cell reselection trigger is satisfied. The UE 100 may perform the process of step S307 after performing the cell reselection. Alternatively, if the cell reselection trigger is satisfied, the UE 100 may perform the process of step S307 before performing the cell reselection.

In step S307, the UE 100 in the RRC semi-connected state performs control to transmit a first cell reselection indication to the eNB 200-1.

The first cell reselection indication is information for notifying the eNB 200-1 that the UE 100 performs the cell reselection. Therefore, the eNB 200-1 can know that the UE 100 performs the cell reselection.

If the cell reselection is performed, the UE 100 may perform control to transmit, to the eNB 200-1, cell information for identifying the reselected cell. For example, the UE 100 may include cell information in the first cell reselection indication. The cell information may be, for example, a physical cell identifier (PCID), a cell identifier (Meas ID or MeasObject ID) indicating the measurement object of the radio signal received from the eNB 200-1, and the like.

In the present embodiment, it is assumed that the UE 100 has selected a cell managed by an eNB 200-2. Accordingly, the eNB 200-1 corresponds to a source eNB, and the eNB 200-2 corresponds to a target eNB.

The UE 100 may perform cell reselection in the RRC semi-connected state after transmitting the first cell reselection indication.

If the eNB 200-1 receives the first cell reselection indication from the UE 100, the eNB 200-1 determines that the UE 100 performs (has performed) the cell reselection. If the eNB 200-1 receives the first cell reselection indication, the eNB 200-1 can stop a handover procedure for the UE 100. Therefore, if the eNB 200-1 has received the measurement report of the radio signal from the UE 100, a handover command is not transmitted to the UE 100. Therefore, signaling can be reduced. Signaling between the eNB 200-1 and the target eNB can also be reduced.

If the cell information is included in the first cell reselection indication, the eNB 200-1 performs the process of step S309.

On the other hand, if the cell information is not included in the first cell reselection indication, the eNB 200-1 may discard context information of the UE 100. Alternatively, the eNB 200-1 may hold the context information of the UE 100 until a predetermined period elapses. Therefore, if the UE 100 requests connection again to the same cell or requests connection to another cell managed by the eNB 200-1, the signaling for establishing the RRC connection can be reduced.

In step S308, the UE 100 may transition from the RRC semi-connected state to the RRC idle state. The UE 100 may transition to the RRC idle state after performing the cell selection. Alternatively, the UE 100 may perform cell reselection after transition to the RRC idle state. In the RRC connected state, the UE 100 may transition from the RRC connected state to the RRC semi-connected state after performing the above-described operation. The process of step S308 may be omitted.

In step S309, the eNB 200-1 determines the target eNB that manages the cell connectable by the UE 100.

For example, the eNB 200-1 holds a list of cells managed by another eNB. The eNB 200-1 determines the target eNB based on the list and the cell information included in the first cell reselection indication. In the present embodiment, the eNB 200-1 determines the eNB 200-2 as the target eNB.

In step S310, the eNB 200-1 performs control to transmit the context information of the UE 100 to the eNB 200-2 that manages the reselected cell. For example, the eNB 200-1 transmits, to the eNB 200-2, a second cell reselection indication including the context information of the UE 100.

The second cell reselection indication includes UE information for identifying the UE 100 in which the context information is used. The UE information includes, for example, any one of an intra-TA ID, an international mobile subscriber identity (IMSI), an identifier (original cell PCID) of a first cell (original cell) that the UE 100 has transitioned to the RRC semi-connected state, and a temporary identifier (for example, original C-RNTI) allocated to the UE 100 in the first cell.

The second cell reselection indication may include cell information for identifying the cell reselected by the UE 100. The cell information is, for example, an identifier (target cell PCIID) of the cell reselected by the UE 100.

The eNB 200-2 receives the second cell reselection indication from the eNB 200-1. By receiving the second cell reselection indication, the eNB 200-2 may recognize that the UE 100 identified by the UE information (for example, intra-TA ID) supports the RRC semi-connected state.

In step S311, the eNB 200-2 may transmit, to the eNB 200-1, an acknowledgment (Cell Reselection Ind. Ack) for the second cell reselection indication. The process of step S311 may be omitted.

When rejecting the holding (storing) of the context information of the UE 100, the eNB 200-2 may transmit a negative acknowledgment (NACK) to the eNB 200-1 for rejecting the holding of the context information. For example, if the eNB 200-2 does not support the operation according to the second embodiment (for example, the use of the context information is not supported), or if the storage capacity for storing the context information of the UE 100 is less than the threshold value, the negative acknowledgment may be transmitted to the eNB 200-1.

If the negative acknowledgment is received from the eNB 200-2, that is, if the eNB 200-2 rejects to hold (store) the context information of the UE 100, the eNB 200-1 performs a handover procedure for handing over the UE 100 to the reselected cell. For example, if the measurement report of the radio signal is received from the UE 100, the eNB 200-1 may restart the stopped handover procedure. If the eNB 200-1 has not received the measurement report from the UE 100, the eNB 200-1 may transmit, to the UE 100, the information for causing the UE 100 to transmit the measurement report.

The eNB 200-1 may have a timer for determining whether to perform the handover procedure. The eNB 200-1 may start the timer in response to reception of the first reselection indication from the UE 100. The eNB 200-1 performs the handover procedure before the timer expires. The eNB 200-1 does not perform the handover procedure if the timer expires.

The eNB 200-1 may configure (in advance) a timer (timer value) to UE 100 according to common signaling (for example, SIB) or dedicated signaling (for example, RRC connection reconfiguration). The UE 100 starts the timer in response to the transmission of the first reselection indication. The UE 100 does not transition to the RRC idle state until the timer expires. Therefore, the UE 100 can receive the signaling from the eNB 200 according to the handover procedure.

If the eNB 200-2 does not store the context information of the UE 100, the UE 100 can reduce the signaling between the UE 100 and the eNB 200-2 by performing the handover procedure, as compared with a case in which the UE 100 newly establishes an RRC connection with the eNB 200-1.

In step S312, the eNB 200-1 transmits a path switch request to the MME 300 so as to notify that the UE 100 has changed the cell.

In response to reception of the path switch request, the MME 300 performs exchange with an S-GW so as to switch an S1 path (downlink path). This causes the S1 path for the UE 100 to be switched from a path between the eNB 200-1 and the S-GW to a path between the eNB 200-2 and the S-GW.

In step S313, if the S1 path is switched, the MME 300 transmits a response (Path Switch Ack) to the path switch request to the eNB 200-1.

In step S314, user data to be communicated is generated in the UE 100. The UE 100 selects a cell managed by the eNB 200-2 by performing the cell reselection.

In step S315, if communication of user data is newly started in the reselected cell, the UE 100 performs control to transmit, to the reselected cell, predetermined information for promoting the use of the context information. That is, the UE 100 can transmit a connection request including predetermined information to the reselected cell (eNB 200-2).

The predetermined information may include flag information. The predetermined information may be included in a radio signal (random access channel (RACH)) in a random access procedure for the UE 100 to transition to the RRC connected state. The predetermined information may be included in message 1 (random access preamble) or may be included in message 3 (scheduled transmission). The predetermined information may include UE information (for example, original cell PCID, original C-RNTI, or the like) transmitted from the eNB 200-1 to the eNB 200-2.

The UE 100 may transmit the predetermined information to the reselected cell only when the reselected cell can utilize the context information. For example, the eNB 200-2 can transmit determination information for determining whether the context information is available in a cell managed by its own station by common signaling (for example, SIB). The eNB 200-2 receives the context information of the UE 100 that has transitioned from the another eNB 200 (eNB 200-1) to the RRC semi-connected state in the cell managed by its own station, and if the operation of storing the context information of the UE 100 is supported, the eNB 200-2 can transmit, to the cell, the determination information indicating that the context information is available. If the operation is not supported by the eNB 200-2, the eNB 200-2 may transmit, to the cell, the determination information indicating that the context information is not available. Even if the operation is supported, the eNB 200-2 may transmit, to the cell, the determination information indicating that the context information cannot be available (temporarily), if the storage capacity is less than the threshold value due to the hardware load of the eNB 200-2.

In response to reception of the connection request from the UE 100, the eNB 200-2 starts control for establishing the RRC connection with the eNB 200 (cell). If predetermined information is included in the connection request, the eNB 200-2 confirms whether the context information of the UE 100 is stored. For example, the eNB 200-2 specifies the context information of the UE 100 based on the UE information. If the eNB 200-2 stores the context information of the UE 100, the eNB 200-2 controls the connection of the UE 100 to the cell based on the context information. That is, the eNB 200-2 performs control for establishing (reestablishing) RRC connection with UE 100 (for example, resume of RRC connection, or the like). On the other hand, if the context information of the UE 100 is not stored, the eNB 200-2 controls connection of the UE 100 to the cell as usual.

The eNB 200-2 may recognize that the UE 100 supports the RRC semi-connected state by including predetermined information (for example, UE information) in the radio signal in the random access procedure received from the UE 100.

If the eNB 200-2 receives the connection request from the UE 100, the eNB 200-2 may newly allocate the identifier (C-RNTI) to the UE 100. The eNB 200-2 may allocate the same C-RNTI included in the UE information to the UE 100.

In step S316, the eNB 200-2 may transmit a response to the connection request to the UE 100. The response may be message 2 or message 4 in the random access procedure. Alternatively, the eNB 200-2 may transmit a response to the connection request to the UE 100 after the RRC connection with the UE 100 is established. The process of step S316 may be omitted.

In step S317, the UE 100 starts transmitting user data while the RRC connection is established. The eNB 200-2 receives the user data.

As described above, the eNB 200-2 performs control to receive, from the eNB 200-1, the context information of the UE 100 in the RRC idle state or the RRC semi-connected state in the eNB 200-1. The eNB 200-2 controls the connection of the UE 100 to the cell based on the context information of the UE 100. In this manner, the eNB 200-2 controls the connection of the UE 100 to the cell based on the context information of the UE 100, and thus the signaling can be reduced.

In this manner, in a case in which the UE 100 transitions to the RRC semi-connected state, not the eNB-based mobility (handover) but the UE-based mobility is performed. Therefore, it is possible to reduce signaling (measurement report configuration, handover command, or the like) performed in the handover procedure.

Modification According to Second Embodiment

Figure 9:
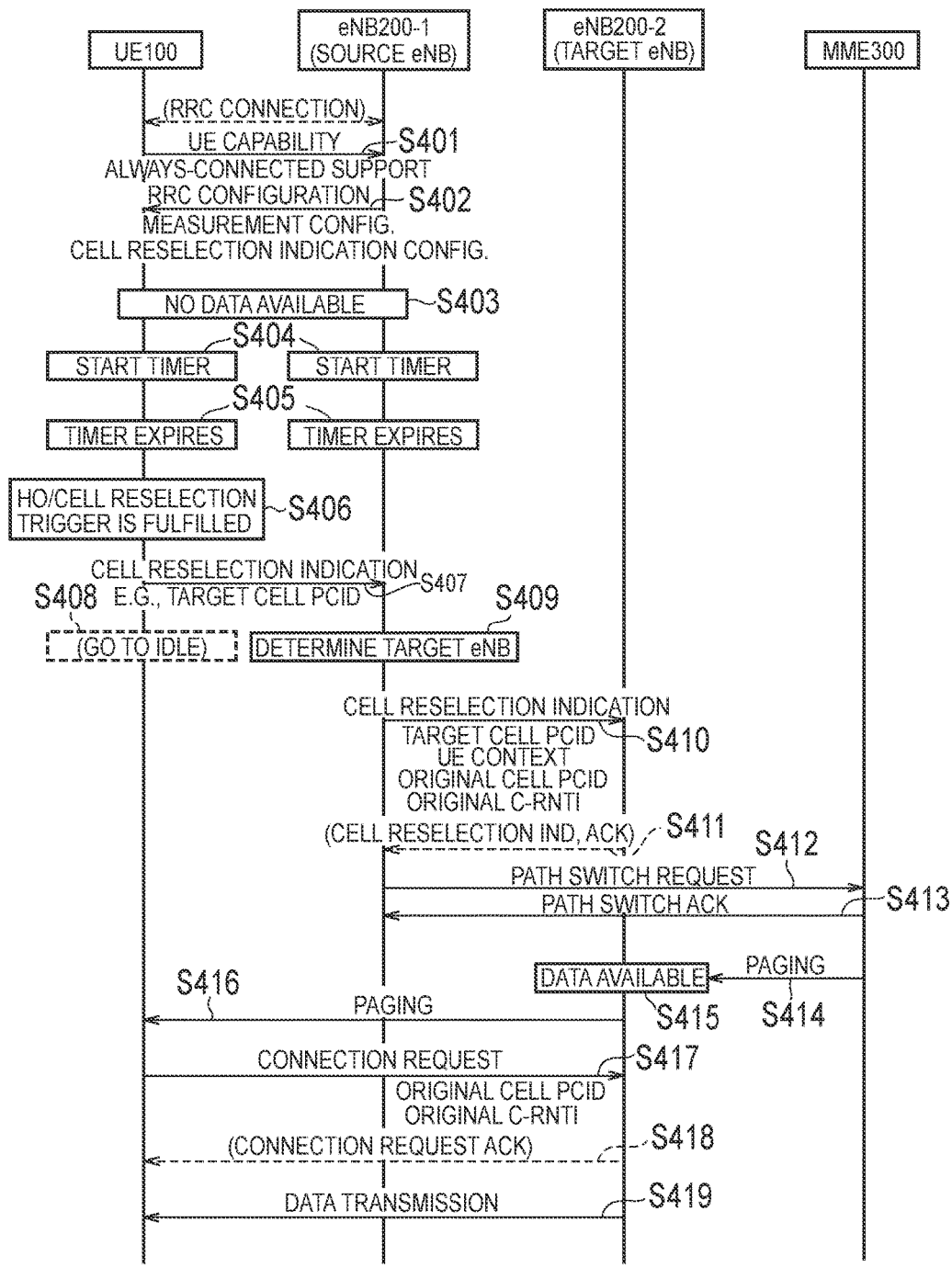
FIG. 9 is a sequence diagram for explaining a modification according to the second embodiment.

A modification according to the second embodiment will be described with reference to FIG. 9. FIG. 9 is a sequence diagram for explaining a modification according to the second embodiment. In the modification, a case in which user data is generated on a network side will be described.

Steps S401 to S413 correspond to steps S301 to S313.

In step S414, an MME 300 transmits, to an eNB 200-2, a paging message including user data of a UE 100.

In step S415, the user data of the UE 100 is generated in the eNB 200-2.

In step S416, the eNB 200-2 transmits a paging message to the UE 100. The UE 100 receives the paging message from the eNB 200-2.

In step S417, the UE 100 transmits a connection request to a reselected cell (eNB 200-2) in response to the reception of the paging message. As in S315, the connection request can include predetermined information (original cell PCID, original C-RNTI, or the like).

Steps S417 to S419 correspond to steps S315 to S317.

Third Embodiment

Figure 10:
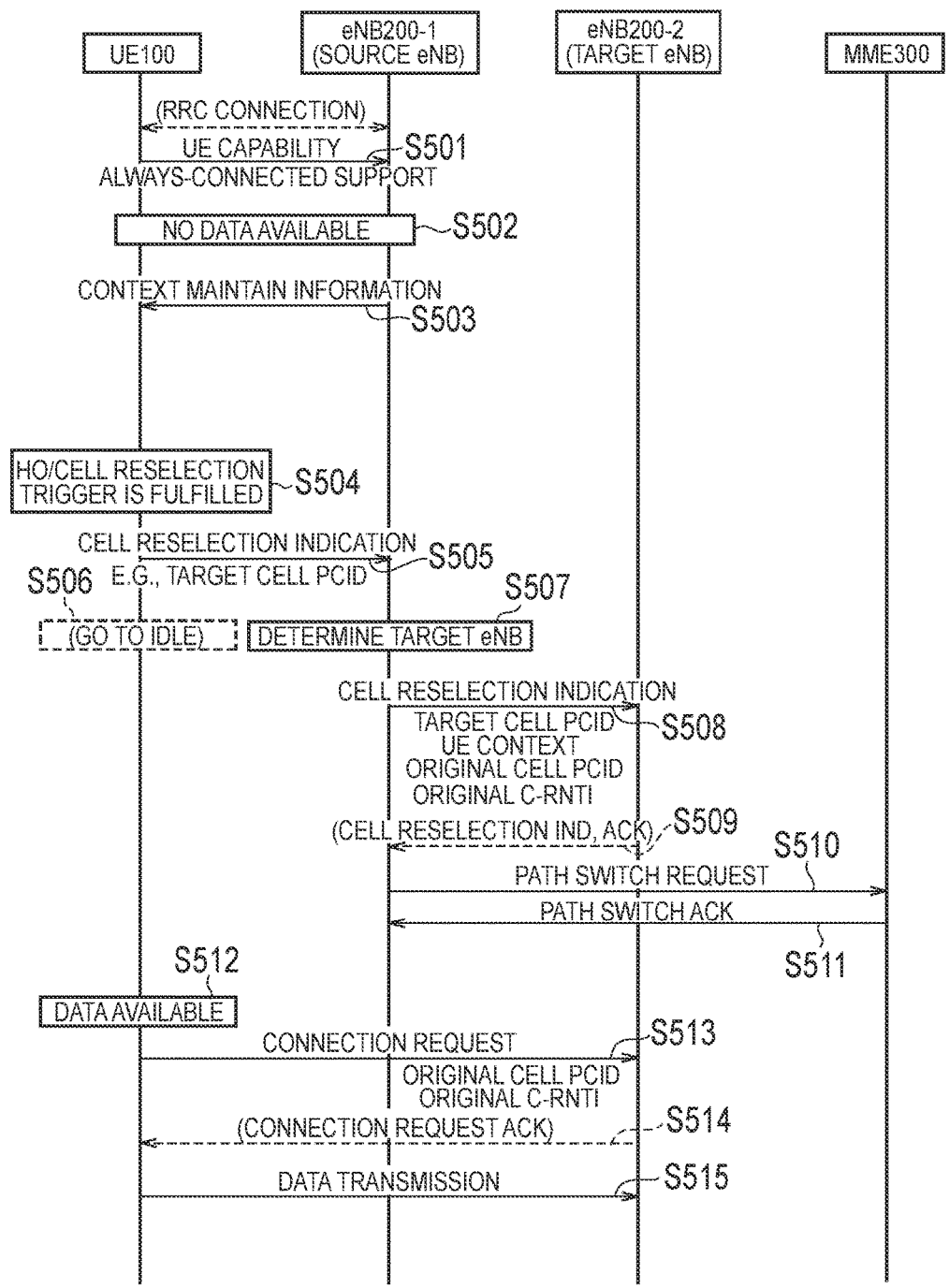
FIG. 10 is a sequence diagram for explaining an operation according to a third embodiment.

Next, a third embodiment will be described with reference to FIG. 10. FIG. 10 is a sequence diagram for explaining an operation according to a third embodiment. The same parts as those described above are omitted as appropriate. In the third embodiment, a UE 100 transitions to an RRC semi-connected state based on information from an eNB 200-1.

As illustrated in FIG. 10, steps S501 and S502 correspond to steps S301 and S302.

In step S503, the eNB 200-1 transmits, to the UE 100, context maintain information for notifying the UE 100 that the eNB 200-1 holds context information without discarding the context information. The UE 100 receives the context maintain information from the eNB 200-1.

The eNB 200-1 may transmit the context maintain information to the UE 100 if the timer expires in the first embodiment.

The UE 100 performs control to transition to the RRC semi-connected state based on the context maintain information.

The context maintain information may include flag information indicating that the context information of the UE 100 is maintained. The context maintain information may include a timer value indicating a period for maintaining the context information of the UE 100.

Steps S504 to S515 correspond to steps S306 to S317.

If the context maintain information includes the timer value, the UE 100 can perform the processes of step S504 and subsequent steps as long as the timer in which the timer value is configured is before expiration. If the timer expires, the UE 100 transitions to the RRC idle state and performs the existing operation.

If data is generated in the network (eNB 200-2), the same operation as the modification of the second embodiment (see FIG. 9) may be performed.

Other Embodiments

While the contents of the present application have been described in accordance with the embodiments described above, it should not be understood that the description and drawings constituting a part of this disclosure limit the contents of the present application. From this disclosure, various alternative embodiments, examples, and operational technologies will become apparent to those skilled in the art.

In the first to third embodiments described above, the UE 100 has transitioned to the RRC semi-connected state, but the present disclosure is not limited thereto. The UE 100 may be able to perform the operation described above and below even if the UE 100 is in the RRC connected state or the RRC idle state.

For example, in the first and second embodiments, if the timer expires, the UE 100 in the RRC connected state may perform the above operation without transitioning to the RRC semi-connected state.

For example, in the third embodiment, if an RRC connection release message including context maintain information is received, the UE 100 may perform the operation of the third embodiment after transitioning from the RRC connected state to the RRC idle state, and may perform the operation of the third embodiment in the RRC connected state. If the timer expires, the UE 100 may transition from the RRC connected state to the RRC idle state.

In the first to third embodiments described above, the eNB 200 holds the context information of the UE 100, but the present disclosure is not limited thereto. For example, the eNB 200-1 may maintain the S1 connection in addition to holding the context information. Alternatively, the eNB 200 may maintain the S1 connection instead of holding the context information. This makes it possible to reduce the signaling for newly establishing the S1 connection.

Figure 11:
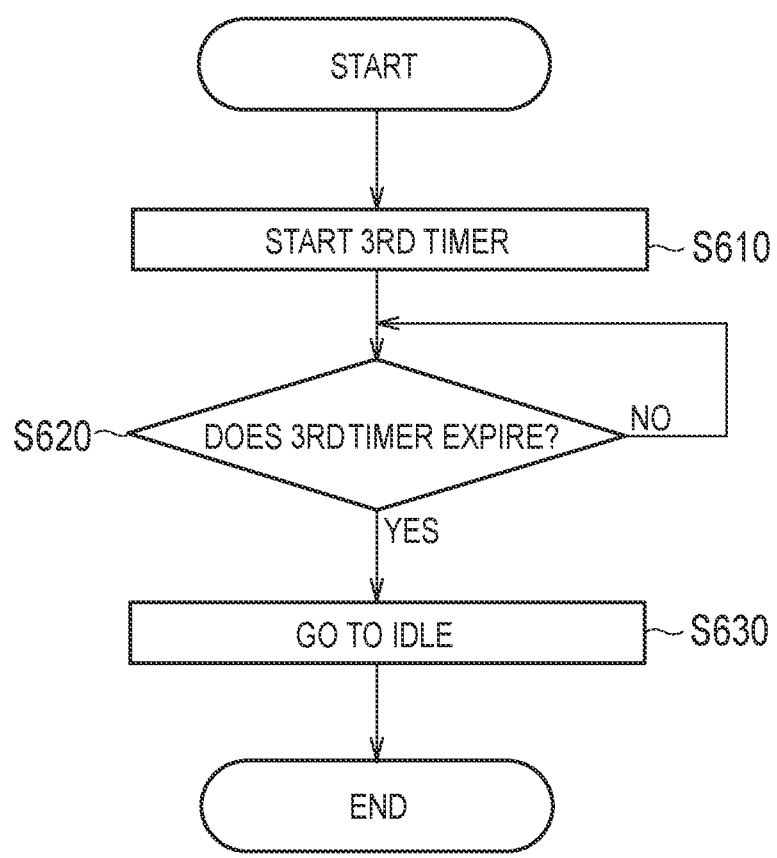
FIG. 11 is a flowchart for explaining a third timer.

In modification 3 according to the first embodiment described above, the UE 100 includes the first timer and the second timer, but the present disclosure is not limited thereto. UE 100 may include other timers. For example, the UE 100 may include a third timer for transitioning from the RRC semi-connected state to the RRC idle state. FIG. 11 is a flowchart for explaining the third timer. As illustrated in FIG. 11, the UE 100 starts the third timer (S610). The UE 100 may start the third timer if the communication of the user data is ended. The timer value of the third timer is longer than the timer value of the second timer. Alternatively, the UE 100 may start the third timer if the second timer expires. The handling (resetting, restarting, or the like) of the third timer may be similar to that of the second timer.

The UE 100 determines whether the third timer expires (S620). When the third timer expires, the UE 100 transitions from the RRC semi-connected state to the RRC idle state (S630). If the third timer does not expire, the UE 100 repeats the process of step S620 while the third timer is operating.

In the second embodiment described above, if the predetermined information is included in the connection request from the UE 100, the eNB 200-2 confirms whether the context information of the UE 100 is stored, but the present disclosure is not limited thereto. Even if the predetermined information is not included in the connection request from the UE 100, the eNB 200-2 may confirm whether the context information of the UE 100 is stored.

If the eNB 200-2 stores the context information of the UE 100, the eNB 200-2 may transfer the context information of the UE 100 to another eNB 200.

In the second and third embodiments described above, the UE 100 may not transmit the cell reselection indication to the eNB 200-1. Therefore, signaling can be reduced. In this case, the UE 100 can transmit the connection request to the reselected cell according to the existing operation.

In each of the above-described embodiments, the eNB 200 may configure the RRC semi-connected state to the UE 100. For example, if the RRC semi-connected state is configured to the UE 100 by the RRC connection reconfiguration, the UE 100 may perform at least one of the operations according to the above-described embodiments (operation of each timer, transition to the RRC semi-connected state, returning from the RRC semi-connected state to the RRC connected state, transition from the RRC semi-connected state to the RRC idle state, or the like). For example, if the RRC semi-connected state is configured to the UE 100 by the RRC connection release message, the UE 100 may perform at least one of the operations according to the above-described embodiments.

In each of the above-described embodiments, the UE 100 notifies the eNB 200 of whether the UE 100 supports the RRC semi-connected state according to the UE capability information, but the present disclosure is not limited thereto. For example, the UE 100 may notify the eNB 200 that the UE 100 supports the RRC semi-connected state by notifying the eNB 200 that the UE 100 desires the RRC semi-connected state. Even if the eNB 200 receives, from the UE 100, the notification indicating that the RRC semi-connected state is desired, the eNB 200 transmits, to the UE 100, an acknowledgment (or RRC connection reconfiguration including the configuration of the RRC semi-connected state) to the notification. If the UE 100 receives an acknowledgement (or RRC connection reconfiguration), the UE 100 may perform at least one of the operations according to the above-described embodiments.

In each of the above-described embodiments, as at least part of the configuration information about the signaling between the UE 100 and the eNB 200 is deactivated (or released) in the RRC semi-connected state, the UE 100 may restrict or exempt the transmission of the predetermined radio signal. As at least part of the configuration information about the signaling between the UE 100 and the eNB 200 by not the signaling from the explicit eNB 200 but the timer, the UE 100 may restrict and exempt the transmission of the predetermined radio signal. In the semi-connected state, as the UE 100 maintains the configuration information about the connection (for example, RRC connection) configured from the eNB 200, the UE 100 may omit the transmission of at least part of the signaling between the UE 100 and the eNB 200, as compared with the case of transitioning from the RRC idle state to the RRC connected state.

In at least one of the above-described embodiments, if the eNB 200 holds the user data to be transmitted to the UE 100 in the RRC semi-connected state, the eNB 200 may transmit a paging message to the UE 100 before transmitting the user data. In response to the reception of the paging message, the UE 100 may transition from the RRC semi-connected state to the RRC connected state. After the UE 100 transitions to the RRC connected state, the eNB 200 may transmit the user data to be transmitted to the UE 100.

In each of the above-described embodiments, the RRC semi-connected state may be referred to as an inactive state or a light connected state. The RRC semi-connected state may be a state in which the RRC connection is suspended (an RRC connection suspended state or a user plane CIoT EPS optimization state).

As described above, the information (always-connected support) indicating that the UE 100 supports the RRC semi-connected state may be at least one of information indicating that UE 100 supports user plane CIoT EPS optimization (user plane CIoT EPS optimization supported), information (RRC connection suspension supported) indicating that UE 100 supports RRC connection suspension, information (light connection supported) indicating that the UE 100 supports a light connection, and information indicating that the UE 100 supports the inactive state (inactive mode supported).

The operations according to the above-described embodiments may be combined as appropriate. In each of the above-described sequences, all operations are not necessarily essential. For example, only part of the operations may be performed in each sequence.

Although not specifically described in each of the above-described embodiments, a program that causes a computer to perform each process performed by any of the above-described nodes (UE 100, eNB 200, and the like) may be provided. The program may be recorded on a computer-readable medium. The program may be installed on the computer by using the computer-readable medium. Here, the computer-readable medium on which the program is recorded may be a non-transitory recording medium. The non-transitory recording medium is not particularly limited, but may be a recording medium such as, for example, CD-ROM and DVD-ROM.

A chip constituted by a memory that stores a program for performing each process performed by any of the UE 100 and the eNB 200 and a processor that performs the program stored in the memory may be provided.

In the above-described embodiment, the LTE system has been described as an example of the mobile communication system, but the present disclosure is not limited to the LTE system, and the contents according to the present application may be applied to systems other than the LTE system.

The invention claimed is:

1. A communication method comprising:
    transmitting first information for causing a radio terminal to hold context information of the radio terminal, from a network to the radio terminal in a radio resource control (RRC) connected state, wherein the context information includes a cell-radio network temporary identifier (C-RNTI) allocated to the radio terminal; and
    in the radio terminal:
        holding the context information without discarding the context information, based on the first information, even if the radio terminal transitions from the RRC connected state;
        performing a cell reselection after transitioning from the RRC connected state;
        receiving, from a reselected cell, information for determining whether the context information is available in the reselected cell; and
        only when the context information is available in the reselected cell, performing control to transmit, to the reselected cell, information for promoting use of the context information, wherein
    the radio terminal includes, into message 3 in a random access procedure, predetermined information for promoting the use of the context information, and
    the message 3 is transmitted from the radio terminal to the reselected cell.

2. The communication method according to claim 1, wherein
    even in a case of transitioning from the RRC connected state, information indicating that the radio terminal supports an operation of holding the context information without discarding the context information is transmitted from the radio terminal to the network.

3. The communication method according to claim 1, wherein information indicating whether a base station constituting the network supports a use of the context information when the RRC connection with the network is established is transmitted in a cell by a system information block (SIB).

4. A radio terminal comprising:
    a receiver configured to receive, from a network, first information for causing the radio terminal to hold context information of the radio terminal when the radio terminal is in a radio resource control (RRC) connected state, wherein the context information includes a cell-radio network temporary identifier (C-RNTI) allocated to the radio terminal; and
    a controller including at least one processor configured to perform processes of:
        holding the context information without discarding the context information, based on the first information, even if the radio terminal transitions from the RRC connected state;
        performing a cell reselection after transitioning from the RRC connected state;
        receiving, from a reselected cell, information for determining whether the context information is available in the reselected cell; and
        only when the context information is available in the reselected cell, performing control to transmit, to the reselected cell, information for promoting use of the context information, wherein
    the radio terminal includes, into message 3 in a random access procedure, predetermined information for promoting the use of the context information, and
    the message 3 is transmitted from the radio terminal to the reselected cell.

* * * * *